United States Patent
Bräutigam et al.

(10) Patent No.: US 11,897,305 B2
(45) Date of Patent: Feb. 13, 2024

(54) ACTIVE ROLL STABILIZER

(71) Applicant: Schaeffler Technologies AG & Co. KG, Herzogenaurach (DE)

(72) Inventors: Martin Bräutigam, Röttenbach (DE); Mario Arnold, Aurachtal (DE); Ramon Jurjanz, Erlangen (DE); Simon Sagewka, Fürth (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 286 days.

(21) Appl. No.: 17/298,772

(22) PCT Filed: Nov. 7, 2019

(86) PCT No.: PCT/DE2019/100961
§ 371 (c)(1),
(2) Date: Jun. 1, 2021

(87) PCT Pub. No.: WO2020/114545
PCT Pub. Date: Jun. 11, 2020

(65) Prior Publication Data
US 2022/0032723 A1 Feb. 3, 2022

(30) Foreign Application Priority Data
Dec. 4, 2018 (DE) .................. 10 2018 009 454.6

(51) Int. Cl.
*B60G 21/055* (2006.01)
*B60G 17/019* (2006.01)
(Continued)

(52) U.S. Cl.
CPC ....... *B60G 21/0555* (2013.01); *B60G 17/019* (2013.01); *H02K 5/04* (2013.01);
(Continued)

(58) Field of Classification Search
CPC .. H02K 5/04; H02K 5/15; H02K 5/16; H02K 5/1732; H02K 7/116; H02K 7/14;
(Continued)

(56) References Cited

U.S. PATENT DOCUMENTS

2010/0207343 A1* 8/2010 Sano .................. B60G 17/0162
280/124.106

FOREIGN PATENT DOCUMENTS

DE 102006008417 A1 8/2007
DE 102010034801 A1 2/2012
(Continued)

OTHER PUBLICATIONS

Description Translation for WO 2015113535 from Espacenet (Year: 2015).*

*Primary Examiner* — Jason D Shanske
*Assistant Examiner* — Daniel M. Keck

(57) ABSTRACT

An active roll stabilizer includes a divided torsion bar (1) having torsion bar parts (2, 3) which are arranged one behind the other along a torsion bar axis. An actuator (4) for transmitting torsional torques to the torsion bar (1) is provided. An electric motor (7) and a transmission (6) connected to the electric motor (7) are arranged in an actuator housing (5). The actuator housing (5) is connected to the one torsion bar part (2) for conjoint rotation and the transmission (6) is connected, on the output side, to the other torsion bar part (3) for conjoint rotation. A motor housing (11) of the electric motor (7) is connected, by means of only one of the two axial ends of said motor housing, to the actuator housing (5) for conjoint rotation.

12 Claims, 1 Drawing Sheet

(51) Int. Cl.
*H02K 5/04* (2006.01)
*H02K 7/116* (2006.01)
*H02K 5/15* (2006.01)
*H02K 5/173* (2006.01)
*H02K 7/14* (2006.01)

(52) U.S. Cl.
CPC ........ *H02K 7/116* (2013.01); *B60G 2202/135* (2013.01); *B60G 2202/42* (2013.01); *B60G 2204/8306* (2013.01); *B60G 2600/182* (2013.01); *B60G 2800/012* (2013.01)

(58) Field of Classification Search
CPC .. F16C 35/042; F16C 35/045; B60G 17/0157; B60G 17/019; B60G 21/0555; B60G 2202/135; B60G 2202/42; B60G 2202/442; B60G 2204/10; B60G 2204/11; B60G 2204/418; B60G 2204/4191; B60G 2204/8306; B60G 2206/82; B60G 2400/0516; B60G 2400/98; B60G 2600/182; B60G 2800/012

See application file for complete search history.

(56) References Cited

FOREIGN PATENT DOCUMENTS

| | | | |
|---|---|---|---|
| DE | 102012205754 A1 * | 10/2013 | ............... H02K 5/04 |
| DE | 102014205262 A1 | 9/2015 | |
| DE | 102015203078 A1 | 8/2016 | |
| DE | 102018102433 A1 | 6/2019 | |
| DE | 102018102666 A1 | 8/2019 | |
| EP | 1627757 A1 | 2/2006 | |
| EP | 1714809 B1 | 4/2009 | |
| WO | 2009063798 A1 | 5/2009 | |
| WO | WO-2015113535 A2 * | 8/2015 | ............. H02K 11/21 |

* cited by examiner

ACTIVE ROLL STABILIZER

CROSS-REFERENCE TO RELATED APPLICATIONS

This application is the U.S. National Phase of PCT Appln. No. PCT/DE2019/100961 filed Nov. 7, 2019, which claims priority to DE 10 2018 009 454.6 filed Dec. 4, 2018, the entire disclosures of which are incorporated by reference herein.

TECHNICAL FIELD

The present disclosure relates to an active roll stabilizer for a motor vehicle. Roll stabilizers of this type reduce rolling movements of the vehicle body when driving through bends.

BACKGROUND

From EP1714809 B1, an electromechanical roll stabilizer has become known, having a torsion bar divided into torsion bar parts arranged one behind the other along a torsion bar axis, and having an actuator provided between the two torsion bar parts for the transmission of torsional moments to the torsion bar, in the actuator housing of which a transmission and an electric motor are arranged, wherein the actuator housing is connected to the one torsion bar part, and an output shaft of the transmission is connected to the other torsion bar part.

The electric motor is usually connected to the actuator housing with its motor housing for conjoint rotation. System loads are transferred between the two torsion bar parts via the actuator. These system loads are often associated with elastic deformation of components that transfer this system load at least as a partial load.

SUMMARY

It is desirable to specify an active roll stabilizer which allows the system loads to be transferred to the actuator in a reliable manner.

An active roll stabilizer is provided with a torsion bar which is divided into torsion bar parts, arranged one behind the other along a torsion bar axis. The ends of the two torsion bar parts facing away from one another can be connected on the wheel carrier side in a known manner. An actuator is provided between the two torsion bar parts to transmit torsional moments to the torsion bar. A transmission and an electric motor are arranged in the actuator housing. The actuator housing is connected to the one torsion bar part for conjoint rotation. The transmission, in particular formed as a planetary transmission, is connected to the other torsion bar part for conjoint rotation on the output side. The motor shaft transfers the motor torque to the input shaft of the transmission. This motor torque is lower than the torque on the transmission output side.

The motor housing of the electric motor is connected to the actuator housing for conjoint rotation with only one of its two axial ends. The motor housing and the actuator housing can advantageously be arranged axially parallel to one another and extend along the actuator axis. This arrangement ensures that the motor housing only absorbs the torque of the motor shaft. At the same time, it is ensured that this motor-side torque is supported on the actuator housing.

An advantage can be seen in the fact that a sensor element in the electric motor is not affected by the system load. This sensor element includes a rotor position sensor that detects the rotational position of the rotor of the electric motor. This rotor position sensor is mounted on the housing on the electric motor. A calibrated alignment of the sensor element is not manipulated as a result of a system load.

The absence of a system load in the motor housing ensures that the rotational position of the rotor or the motor shaft is correctly determined and that torsion of the actuator housing does not affect the measurement result.

The connection for conjoint rotation of the electric motor only at one motor end in the actuator housing prevents a partial load of the system load from flowing through the motor housing. Thus the motor only supports its own torque and no system load. In this way, it is achieved that a torque transmitted between the bearing shield and motor housing is only caused by the torque applied by the motor shaft, which is transmitted into the actuator housing via the motor housing, preferably via the bearing shield.

The connection for conjoint rotation between the electric motor and the actuator housing encompasses form-fitting, frictionally engaged, and firmly bonded connections. For example, a form-fitting connection can have a type of polygonal profile of the actuator housing and the motor housing, which engage in such a way that torques are transmitted in a form-fitting manner. Alternatively or additionally to the form fit, a frictionally engaged connection can be provided. For example, the electric motor can be pressed into the actuator housing. The actuator housing and the motor housing can also be welded to one another. Connections for conjoint rotation are preferably provided as fixed connections by means of the connection types mentioned.

Electric motors usually have bearing shields on which the rotor is mounted. The bearing shield A is typically provided with a bushing for the motor shaft. The bearing shield B arranged on the opposite axial end of the electric motor can, for example, carry the sensor element with the rotor position sensor or be arranged adjacent thereto. These bearing shields can be pressed into a sleeve-shaped housing of the motor housing. One of these two bearing shields can be provided with a shoulder that is connected to the actuator housing for conjoint rotation or to a machine part that is connected to the actuator housing for conjoint rotation. The other bearing shield can cooperate with a shoulder in a clearance fit with the actuator housing or with a machine part, which in turn is connected to the actuator housing for conjoint rotation. In this case, the shoulder of this other bearing shield and a bearing surface of the actuator housing or of the machine part are cylindrical so that relative rotations are possible.

If pressing in the bearing shield or pressing in the machine part—preferably a ring gear of a planetary transmission—is provided, it can be expedient to coat the inner diameter of the actuator housing for better force transmission in order to obtain a higher coefficient of friction in the press connections and thus be able to transfer higher forces/torques. The omission of even a partial load of the system load in the motor housing allows for a weaker design of the interference fit between the motor housing and the bearing shield.

The motor housing described above can have a hollow cylindrical sleeve and two bearing shields, each arranged at an axial end of the sleeve, of which at least one is connected to the sleeve fixedly or for conjoint rotation. The other bearing shield can also be integrally formed thereon, for example. One of the two bearing shields can have an annular shoulder which is connected to the actuator housing for conjoint rotation or to a ring gear connected to the actuator housing for conjoint rotation. The other bearing shield can also have an annular shoulder that is supported with play on the actuator housing or on a ring gear of a planetary transmission that is connected to the actuator housing for conjoint rotation.

The bearing shield A can engage in the ring gear of the planetary transmission with play. The structure-borne sound path is interrupted by this transmission-side release of the A-shield with respect to the ring gear or the actuator housing. This improves the acoustic behavior of the system. The bearing shield, with its annular shoulder, can engage in a cylindrical recess of the ring gear. Relative rotation between this bearing shield and the actuator housing is possible under system load and elastic deformation of the actuator housing. It can also be advantageous here to use a floating motor shaft—which is connected to the planetary transmission on the input side—to reduce the forced guidance of the planets of the planetary transmission. In this way, the operating backlash can be reduced, which has the advantage of reducing undesirable noises.

BRIEF DESCRIPTION OF THE DRAWINGS

The roll stabilizer is explained in more detail below with reference to exemplary embodiments shown in two figures. In the figures.

DETAILED DESCRIPTION

Figure 1:
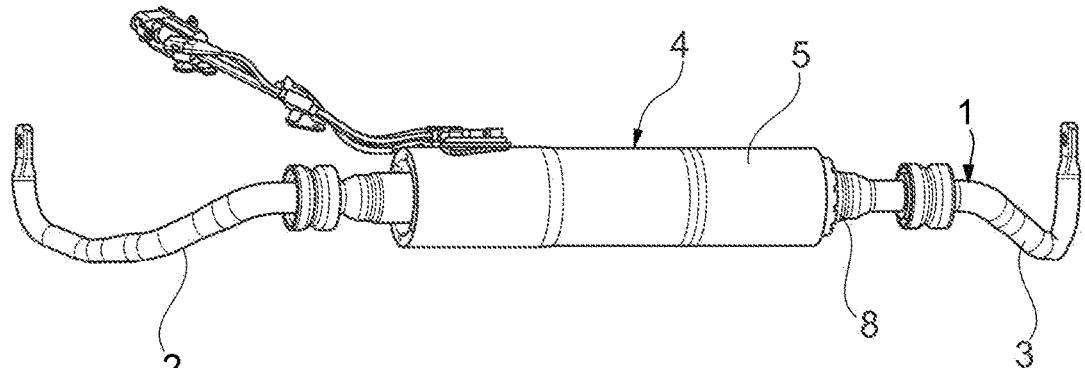
FIG. 1 shows an active roll stabilizer in a perspective representation.
Figure 2:
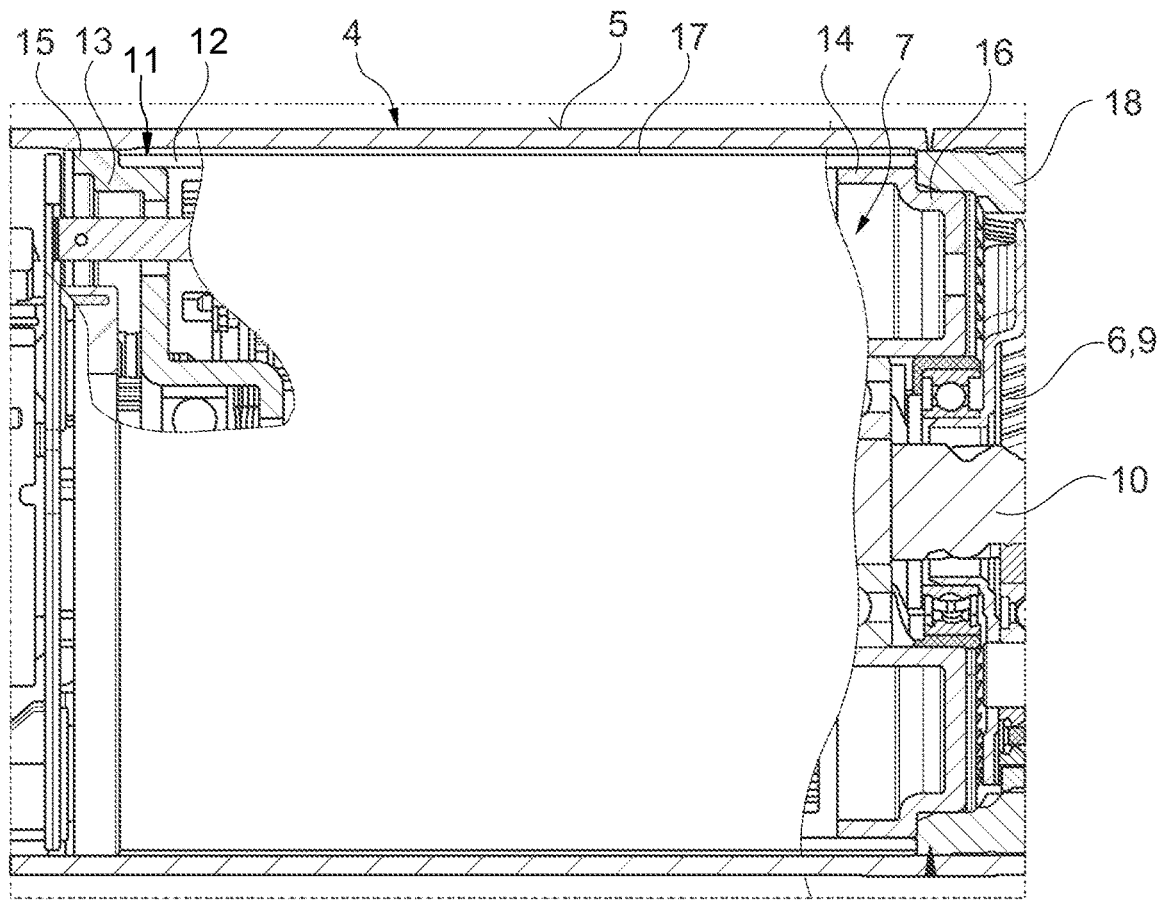
FIG. 2 shows an enlarged detail of the roll stabilizer according to FIG. 1 in longitudinal section.

The active roll stabilizer is provided with a divided torsion bar 1, between which torsion bar parts 2, 3, arranged one behind the other along a torsion bar axis, an actuator 4 is effectively arranged. The actuator 4 is provided for the transmission of torsional moments to the torsion bar 1.

A transmission 6 (only suggested) and an electric motor 7 are arranged in the actuator housing 5. The actuator housing 5 is connected to the one torsion bar part 2 for conjoint rotation. An output shaft 8 of the transmission 6, which is designed in particular as a planetary transmission 9, is connected to the other torsion bar part 3 for conjoint rotation. The motor shaft 10 of the electric motor 7 transfers the motor torque to the input shaft of the transmission 6. The motor shaft 10 can at the same time form the input shaft of the transmission 6.

The motor housing 11 has a hollow cylindrical sleeve 12 which, in the exemplary embodiment, is arranged coaxially with the hollow cylindrical actuator housing 5. A bearing shield 13, 14 is attached to each of the two axial ends of the sleeve 12, on which the motor shaft 10—i.e., the rotor—is rotatably mounted. An annular gap 17 is formed between the sleeve 12 and the actuator housing 5.

The bearing shield 13 is arranged on the side facing away from the transmission 6. This bearing shield 13 has an annular shoulder 15 projecting radially outward. The shoulder 15 of the bearing shield 13 is connected to the actuator housing 5 for conjoint rotation by means of a press fit. Alternatively or additionally, the bearing shield 13 can be connected to the actuator housing 5 in a form-fitting manner or firmly bonded therewith in order to transmit the motor torque.

The bearing shield 14 is arranged on the side facing the transmission 6. This bearing shield 14 has an annular shoulder 16 projecting radially inward. The shoulder 16 of the bearing shield 14 is mounted with a clearance fit on a ring gear 18 of the planetary transmission 9 that is connected to the actuator housing 5 for conjoint rotation.

The motor housing 11 of the electric motor 7 is consequently connected to the actuator housing 5 for conjoint rotation only by means of the bearing shield 13. The motor housing 11 consequently only absorbs the torque of the motor shaft 10. A rotor position sensor (not shown here) is supported on the bearing shield 13 and detects the rotor position of the rotor of the electric motor 7. The absence of a system load in the motor housing 11 ensures that the rotational position of the rotor or the motor shaft 10 is correctly determined and that torsion of the actuator housing 11 does not affect the measurement result.

LIST OF REFERENCE SYMBOLS

1 Torsion bar
2 Torsion bar part
3 Torsion bar part
4 Actuator
5 Actuator housing
6 Transmission
7 Electric motor
8 Output shaft
9 Planetary transmissions
10 Motor shaft
11 Motor housing
12 Sleeve
13 Bearing shield
14 Bearing shield
15 Shoulder
16 Shoulder
17 Gap
18 Ring gear

The invention claimed is:

1. An active roll stabilizer, having a divided torsion bar with two torsion bar parts arranged along a torsion bar axis, an actuator for applying torque to the torsion bar parts, the actuator having an electric motor and a transmission connected to the electric motor arranged within an actuator housing, the actuator housing being connected to one of the two torsion bar parts for conjoint rotation and the transmission being connected, on an output side, to another of the two torsion bar parts for conjoint rotation, wherein a motor housing of the electric motor is connected to the actuator housing for conjoint rotation only via a first bearing shield arranged at a first axial end of the motor housing.

2. The active roll stabilizer according to claim 1, wherein a clearance fit is provided between a second axial end of the motor housing and the actuator housing.

3. The active roll stabilizer according to claim 1, wherein the motor housing has includes a hollow sleeve, the first bearing shield, and a second bearing shield, and the second bearing shield is arranged at a second axial end of the hollow sleeve.

4. The active roll stabilizer according to claim 3, wherein the second bearing shield faces the transmission and the first bearing shield faces away from the transmission.

5. The active roll stabilizer according to claim 4, wherein the second bearing shield is mounted with a clearance fit relative to the actuator housing.

6. The active roll stabilizer according to claim 4, wherein the second bearing shield is mounted with a clearance fit on a ring gear of the transmission.

7. The active roll stabilizer according to claim 3, wherein the first bearing shield has an annular shoulder which is arranged with the actuator housing for conjoint rotation.

8. The active roll stabilizer according to claim 3, wherein an annular gap is formed between the hollow sleeve and the actuator housing.

9. The active roll stabilizer according to claim 3, wherein the second bearing shield has an annular shoulder which is arranged with a ring gear connected to the actuator housing for conjoint rotation.

10. An active roll stabilizer comprising:
a first torsion bar part;
a second torsion bar part;
an actuator housing connected for conjoint rotation with the first torsion bar part;
an electric motor having a motor housing with a hollow sleeve, a first end of the hollow sleeve connected to the actuator housing for conjoint rotation only via a first bearing shield, a second end of the hollow sleeve not connected for conjoint rotation with the actuator housing; and
a transmission having an input connected for conjoint rotation to a rotor of the electric motor and having an output connected for conjoint rotation to the second torsion bar part.

11. The active roll stabilizer according to claim 10, further comprising a second bearing shield arranged at the second end of the hollow sleeve.

12. The active roll stabilizer according to claim 11, wherein the second bearing shield faces the transmission and the first bearing shield faces away from the transmission.

* * * * *